United States Patent [19]

Shupe et al.

[11] 4,269,271

[45] May 26, 1981

[54] EMULSION OIL RECOVERY PROCESS USABLE IN HIGH TEMPERATURE, HIGH SALINITY FORMATIONS

[75] Inventors: Russell D. Shupe, Ponca City, Okla.; Jim Maddox, Jr., Houston, Tex.

[73] Assignee: Texaco Inc., White Plains, N.Y.

[21] Appl. No.: 901,388

[22] Filed: May 1, 1978

[51] Int. Cl.³ ............................................ E21B 43/22
[52] U.S. Cl. ............................... 166/274; 252/8.55 D
[58] Field of Search ............... 252/8.55 D; 166/273, 166/274

[56] References Cited

U.S. PATENT DOCUMENTS

| | | | |
|---|---|---|---|
| 3,500,912 | 3/1970 | Davis et al. | 166/252 |
| 3,827,497 | 8/1974 | Dycus et al. | 166/274 |
| 3,977,471 | 8/1976 | Gale et al. | 252/8.55 X |
| 4,059,154 | 11/1977 | Braden et al. | 166/273 X |
| 4,077,471 | 3/1978 | Shupe et al. | 166/275 |
| 4,088,189 | 5/1978 | Shupe | 166/273 X |
| 4,161,983 | 7/1979 | Schievelbein | 166/273 X |

*Primary Examiner*—Herbert B. Guynn

*Attorney, Agent, or Firm*—Carl G. Ries; Thomas H. Whaley; Jack H. Park

[57] ABSTRACT

Many petroleum formations contain water having high salinity and/or high concentrations of divalent ions such as calcium or magnesium dissolved therein, and are additionally at temperatures from about 70° F. to about 300° F. Most surfactants suitable for use in oil recovery operations are either ineffective in high salinity or high hardness waters, or cannot tolerate the higher temperatures encountered in many such formations. A water-external phase emulsion, microemulsion or micellar dispersion containing a water soluble alkylpolyalkoxyalkylene sulfonate or alkylarylpolyalkoxyalkylene sulfonate and a water-insoluble polyethoxylated aliphatic alcohol (including alkanols) or polyethoxylated alkylphenol nonionic surfactant is an effective fluid for flooding in formations containing water whose salinity is from 70,000 to 220,000 parts per million total dissolved solids and also having temperatures as high as 300° F. The fluid is phase stable over a wide range of formation temperatures and water salinities and hardness values.

14 Claims, No Drawings

EMULSION OIL RECOVERY PROCESS USABLE IN HIGH TEMPERATURE, HIGH SALINITY FORMATIONS

BACKGROUND OF THE INVENTION

1. Field of the Invention

This invention concerns an oil recovery process and more specifically a surfactant-containing emulsion flooding oil recovery process. Still more specifically, this invention is concerned with an oil recovery process using a water-external phase emulsion comprising a dispersed hydrocarbon phase and a continuous aqueous phase, the emulsion containing a water soluble alkylpolyalkoxyalkylene sulfonate or alkylarylpolyalkoxyalkylene sulfonate anionic surfactant and a low HLB nonionic surfactant, which emulsion is phase stable and suitable for flooding formations containing high concentrations of salt and/or divalent ions such as calcium and magnesium, in formations whose temperatures are in the range of from about 70° to about 300° F.

2. Description of the Prior Art

Petroleum is recovered from subterranean formations in which it has accumulated, by penetrating the formation with one or more wells and pumping or permitting the petroleum to flow to the surface through these wells. Recovery of petroleum from formations is possible only if certain conditions exist in the formations. The petroleum must be present in the formation in an adequately high concentration, and there must be sufficient permeability or interconnected flow channels within the formation to permit the flow of fluids therethrough if sufficient pressure is applied to the fluid. When the formation has natural energy present in the form of an active, underlying or edge water drive, or gas dissolved in the petroleum to the producing well, or a high pressure gas cap above the petroleum-saturated portion of the formation, this natural energy is utilized first to recover petroleum. Recovery of petroleum in this manner using natural energy is referred to in the art as primary recovery. When this natural energy source is depleted, or in the instance of those formations which do not contain sufficient natural energy initially to support primary recovery, some form of supplemental or enhanced recovery process must be applied to the formation in order to extract petroleum therefrom. Supplemental recovery is sometimes referred to as tertiary recovery, although in fact it may be primary, secondary or tertiary in sequence of employment.

Waterflooding, which involves the injection of water into the subterranean, petroleum-containing formation for the purpose of displacing petroleum toward the producing well, is the most economical and widely practiced supplemental recovery method. Water does not displace the petroleum efficiently, however, due to at least in part to the fact that water and oil are immiscible and the interfacial tension between water and oil is quite high. Persons skilled in the art of oil recovery have recognized this limitation of waterflooding and many additives have been described in the literature for incorporation in the flooding water to reduce the interfacial tension between the injected water and the formation petroleum. U.S. Pat. No. 2,233,381 (1941) discloses the use of polyglycol ethers as surface acitve agents or surfactants too increase the capillary displacement efficiency of an aqueous flooding medium. U.S. Pat. No. 3,302,713 discloses the use of petroleum sulfonates prepared from specified boiling range fractions of petroleum feedstock as a surfactant in surfactant flooding supplemental oil recovery operations. Other surfactants which have been proposed for oil recovery operations include alkylpyridinium salts, alkyl sulfates, alkylaryl sulfates, ethoxylated alkyl or alkylaryl sulfates, alkyl sulfonates, alkyaryl sulfonates, and quarternary ammonium salts.

The above described surfactants are satisfactory in certain limited applications, particularly in formations containing water whose salinity and hardness, i.e. concentration of divalent ions including calcium and magnesium, and/or temperature, are relatively low. For example, when the salinity of the formation water is less than about 30,000 parts per million and the concentration of divalent ions is less than about 200 to 500 parts per million, petroleum sulfonates are very effective over a broad temperature range. U.S. Pat. Nos. 3,792,731; 3,811,504; 3,811,505; and 3,811,507 describe oil recovery processes employing specified mixtures of water soluble anionic and water soluble nonionic surfactants which exhibit satisfactory performance in petroleum formations containing water having high concentrations of divalent ions, i.e. in the concentration range of from about 500 to 18,000 parts per million calcium and magnesium, but cannot be used in formations whose temperature exceed about 150° F. because of the cloud point limitations of nonionic surfactants.

U.S. Pat. No. 3,508,612 describes an oil recovery method using an aliphatic polyethoxy sulfate and an organic sulfonate. U.S. Pat. No. 3,888,308 describes the use of an aqueous solution of an alkyl or alkylpolyethoxy sulfate as a mobility buffer. U.S. Pat. Nos. 3,827,497 and 3,890,239 describe an oil recovery process and a fluid containing an organic sulfonate and an alkylpolyethoxy sulfonate. U.S. Pat. No. 3,977,471 describes an oil recovery process and a substantially oil-free fluid, e.g. a solution, employing an alkylarylpolyalkoxyalkyl sulfonate in single surfactant mode.

Oil recovery processes employing a substantially oil-free aqueous fluid containing an alkylpolyethoxyalkyl sulfonate or alkylarylpolyalkoxyalkyl sulfonate are uniquely suitable for use in high temperature, high salinity reservoirs. A low HLB, essentially water insoluble nonionic surfactant such as a polyethoxylated alkanol or polyethoxylated alkylphenol may be used in combination with the alkyl or alkylarylpolyalkoxyalkyl sulfonate to ensure phase stability of the aqueous fluid.

It is desirable that the viscosity of the oil recovery fluid be at least slightly greater than water and preferably greater than the crude oil present in the formation to ensure effective volumetric displacement. Microemulsions, emulsions and micellar dispersions exhibit greater viscosities than true solutions of surfactant but it is difficult to form an emulsion which is stable at high temperatures and in the presence of high salinity. Hydrophylic polymers may be incorporated in surfactant solutions to increase their viscosity, but most polymers are not stable at high temperatures or salinities and an interaction occurs between hydrophylic polymers and many surfactants.

In view of the foregoing discussion, it can be appreciated that there is a substantial, unfulfilled commercial need for a surfactant oil recovery method using a phase stable emulsion, microemulsion or micellar dispersion, preferably a viscous emulsion which can be injected into formations whose temperatures are in excess of 70° F., up to 300° F. which formations also contain water having salinities higher than about 30,000 parts per million total dissolved solids, and/or concentrations of divalent ions greater than about 2,000 parts per million.

SUMMARY OF THE INVENTION

The present invention concerns an oil recovery process suitable for use in formations whose temperatures are from 70° F. to 300° F., which formations may also contain water having high salinity and/or high hardness, e.g. salinities from 70,000 to 220,000 parts per million total dissolved solids which may include concentrations of divalent ions greater than about 2,000 parts per million. The oil recovery process involves injecting into the formation a fluid which is a viscous emulsion, micremulsion or micellar dispersion comprising a continuous aqueous phase and a discontinuous or dispersed non-aqueous phase. The emulsion contains at least the following two surfactants.

1. An alkylpolyalkoxyalkylene sulfonate or alkylarylpolyalkoxyalkylene sulfonate having the following structural formula:

$$RO(R'O)_xR''SO_3^-M^+$$

wherein R is a linear or branched aliphatic, alkyl or alkylaryl radical, having from 8 to 24 carbon atoms in the aliphatic or alkyl chain and preferably from 12 to 20 carbon atoms in the aliphatic or alkyl chain, R' is ethylene or a mixture of ethylene and higher alkylene such as propylene with relatively more ethylene than propylene, preferably at least 60% ethylene, R'' is ethylene, propylene, hydroxypropylene or butylene, x is an integer from 1 to 20 and preferably from 2 to 8, and M+ is a monovalent metallic cation such as sodium, potassium, or lithium, or an ammonium ion.

2. A nonionic surfactant which is individually insoluble in the aqueous phase, which is an ethoxylated aliphatic alcohol, e.g. an alkanol, or ethoxxylated alkylphenol having the following structure:

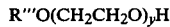

$$R'''O(CH_2CH_2O)_yH$$

wherein R''' is the same as R and y is an integer whose value is from (x−2) to (x+4) and preferably from x to (x+3).

In certain applications, it is preferred that these two surfactants be the principal or sole surface active agents present in the emulsion. In other applications these two materials may be utilized in combinations with other surface active agents such as petroleum sulfonates, alkyl sulfonates or alkylaryl sulfonates, etc. Certain combinations of these two surfactants also result in a more viscous emulsion.

The non-aqueous discontinuous or dispersed phase, is ordinarily a hydrocarbon such as diesel oil, naphtha, crude oil, or a $C_6$ to $C_{30}$ hydrocarbon. The weight percent hydrocarbon is from 0.5 to 30.0 and preferably from 2.0 to 10.0 percent. The dispersed non-aqueous phase may contain mixed surfactant micelles containing the non-aqueous component, e.g., the hydrocarbon. This is sometimes described as a soluble oil, microemulsion or micellar dispersion system.

DESCRIPTION OF THE PREFERRED EMBODIMENTS

The earliest and simplest forms of surfactant flooding described in the art employed in aqueous solution containing a sole primary anionic surfactant, which generally was a petroleum sulfonate. This material is effective only in formations containing relatively low salinity water, e.g. formation water whose salinity is less than about 30,000 parts per million total dissolved solids, and having less than about 200 to about 500 parts per million divalent ions such as calcium and magnesium dissolved therein. Since many oil formations which contain appreciable amounts of unrecoverable oil and are otherwise suitable for surfactant flooding, also contain water having salinities greater than 30,000 parts per million total dissolved solids, and 1 or more than 500 parts per million divalent ions dissolved therein, some modification of this relatively simple flooding procedure was required to permit application of surfactant flooding technology to a greater number of known petroleum reservoirs. Two basic approaches have evolved in the art. One requires that the high salinity formation water be first displaced from the formation by pre-flushing the formation with fresh water to ensure that the water present in the formation when the surfactant is injected is sufficiently fresh that a pertroleum sulfonate can be utilized. In the other approach, a surfactant or combination of surfactants which are effective in the high salinity environment, are identified. For example, a mixture comprising petroleum sulfonate or some other organic sulfonate as the primary anionic surfactant and a solubilizer such as an alcohol or a solubilizing co-surfactant such as a water soluble nonionic surfactant, e.g. a polyethoxylated alcohol or alkylphenol, or an alkylpolyethoxy sulfate or alkylarylpolyethoxy sulfate, or an alkylpolyethoxyalkylene sulfonate or alkylarylpolyethoxyalkylene sulfonate, may be used in the surfactant solution.

Pre-flushing the formation with fresh water has usually not successfully reduced the salinity of the formation water in all portions of the formation through which the surfactant solution will travel.

It has been discovered that certain materials which can be utilized as solubilizng co-surfactants, notably the alkylpolyethoxy sulfate or alkylarylpolyethoxy sulfate, or the alkylpolyalkoxyalkylene sulfonate or alkyarylpolyalkoxyalkylene sulfonate can be utilized as a single surfactant i.e., without petroleum sulfonate or other organic sulfonate for oil recovery purposes in high salinity solutions. These materials appear especially attractive because they are effective in the high salinity ranges in which most primary anionic surfactants such as petroleum sulfonate are not effective, e.g. in the range of from about 70,000 to about 220,000 parts per million total dissolved solids, and also the alkylpolyalkoxyalkylene sulfonate or alkylarylpolyalkoxyalkylene sulfonates are stable and active over a broad range of temperatures whereas many nonionic surfactants such as ethoxylated alcohols or ethoxylated alkylphenols as well as alkylpolyethoxy sulfates or alkylarylpolyethoxy sulfates either become insoluble or hydrolyze at formation temperature substantially in excess of about 125° F.

The use of a single surfactant-containing fluid where the sole surface active agent is an alkylpolyalkoxyalkylene sulfonate or alkylarylpolyalkoxyalkylene sulfonate has been found to exhibit an unexpected problem. Fluids prepared using this surfactant in high salinity environments sometime exhibit phase instability. The fluids, when mixed in the desired concentration ranges, separate into two phases, which render the use of such materials ineffective and possibly hazardous to the formation, since injection of such phase unstable fluid into the formations causes ineffective oil displacement and may lead to plugging of small flow channels in a permeable oil formation. The cause of phase instability is not well understood and does not always occur.

Another problem encountered in using the polyethoxy sulfonates is an adverse interaction between the surfactant and hydrophilic polymers frequently used in enhanced oil recovery processes to form viscous fluids to achieve good mobility ratios needed for efficient volumetric displacement. This interaction is severe and is manifest in phase separation.

The use of surfactant-containing water external emulsions, microemulsions or micellar dispersions for oil recovery purposes is also disclosed in the prior art. These emulsions are more viscous than true solutions and therefore exhibit superior mobility ratios as compared to aqueous solutions. The emulsions described in the art for use in oil recovery processes employ petroleum sulfonates as the sole surfactant, which cause the emulsions to be unstable in the presence of high salinity and/or high divalent ion concentrations.

Considerable difficulty has been encountered in formulating a stable emulsion using the alkylpolyethoxyalkylene sulfonate or alkylarylpolyalkoxyalkylene sulfonate, alone or in combination with petroleum sulfonate. Such emulsions are not phase stable over long periods of time in high salinity, high temperature environments.

We have discovered that the use of a relatively low HLB nonionic surfactant which is essentially insoluble in the aqueous phase of the emulsion, specifically a polyethoxylated aliphatic compound such as a polyethoxylated alkanol, linear or branched or another polyethoxylated aliphatic alcohol, or a polyethoxylated alkylaryl compound such as a polyethoxylated mono or dialkyl substituted phenol, results in achieving sufficient phase stabilization of the emulsion containing the aliphatic polyalkoxyalkylene sulfonate or alkylarylpolyalkoxyalkylene sulfonate so as to permit the use of the emulsion for flooding in high salinity, high temperature environments, e.g. in petroleum formations whose temperature is in the range of from 70° F. to 300° F. and which contain water whose salinity is from 70,000 to 220,000 parts per million total dissolved solids. The effectiveness of the insoluble nonionic surfactant is particularly surprising, since water-soluble nonionic surfactants such as are taught in the prior art for use in oil recovery processes, are not effective for this purpose, whereas the water insoluble nonionic surfactants are effective for our purpose. Water solubility of a nonionic surfactant is determined by the balance between the number of water soluble ethylene oxide groups and the length of the oil soluble alkyl chain in the alkyl or alkylaryl portion of the surfactant molecule. A water soluble nonionic surfactant which can be used in our process may differ from a water soluble nonionic such as is taught in the prior art but which will not work in our process, only in that the water insoluble nonionic surfactant will have from one to six fewer moles of ethylene oxide per mole of surfactant than an otherwise similar water soluble nonionic surfactant.

The specific emulsion utilized in the oil recovery process of our invention comprises a continuous aqueous phase and a dispersed or discontinuous, non-aqueous phase. The surfactants employed in our processes comprise the following:

(1) From about 0.1 to about 10.0 and preferably from about 0.2 to about 5.0 percent by weight of an anionic surfactant having the following general formula:

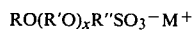

$$RO(R'O)_xR''SO_3^-M^+$$

wherein R is an aliphatic radical such as an alkyl group, branched or straight chain, containing from 8 to 30 and preferably 12 to 20 carbon atoms, or an alkylaryl group such as benzene, toluene or xylene having attached thereto a linear or branched alkyl chain having from 8 to 24 and preferably from 12 to 20 carbon atoms in the alkyl chain, R' is ethylene or a mixture of ethylene and higher alkylene such as propylene with relatively more ethylene than propylene, preferably at least 60 percent ethylene;

x is an integer from 1 to 20 and preferably from 2 to 8,

R" is ethylene, propylene, hydroxypropylene or butylene, and

M+ is a monovalent cation such as ammonium or a monovalent metallic cation including sodium, potassium, and lithium. For example, a preferred surfactant for use is one in which R is a mixture of aliphatics having from 16 to 20 carbon atoms, R' is ethylene, x is 3, R" is propylene, and M+ is sodium.

(2) From 0.002 to 5.0 and preferably from 0.01 to 1.0 percent by weight of a phase-stabilizing additive, which is a low HLB water insoluble nonionic surfactant having the following general structure:

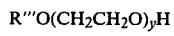

$$R'''O(CH_2CH_2O)_yH$$

wherein R''' is an aliphatic radical including an alkyl group linear or branched, or alkylaryl, having from 8 to 25 carbon atoms and preferably from 12 to 20 carbon atoms in the aliphatic or alkyl chain and y is an integer from 1 to 10 and preferably from 2 to 6. Ordinarly once the value of x in the alkylpolyalkoxyalkylene sulfonate or alkylarylpolyalkoxyalkylene sulfonate is known, the value of y for a nonionic surfactant having the same or an equivalent oil soluble group should be from (x−2) to (x+4) and is preferably from x to (x+3). For example, an ethoxylated straight chain aliphatic alcohol having from 16 to 20 carbon atoms in the aliphatic chain and containing an average of 3-6 ethoxy groups per molecule is a preferred water insoluble, nonionic surfactant for use as an emulsion stabilizing additive for use in combination with the $C_{16}$-$C_{20}$ alkyltriethoxypropylene sulfonate described above.

The above described two component surfactant mixture may be employed in the emulsion injected into a subterranean formation containing relatively high salinity water, e.g. water having a salinity in the range of from about 70,000 to about 220,000 parts per million total dissolved solids, which may include from about 3,000 to about 15,000 parts per million polyvalent ions such as calcium or magnesium, the temperature of the formation being from 70° F. to 300° F.

In another embodiment, the emulsion contains, in addition to the two surfactants described above, from 0.1 to 10.0 and preferably from 0.2 to 5.0 percent by weight of an organic sulfonate such as a petroleum sulfonate having a median equivalent weight from about 300 to 500, or an alkyl sulfonate or an alkylaryl sulfonate containing from 12 to 24 carbon atoms. The mean equivalent weight of an optimum petroleum sulfonate for use in the emulsion described above, is somewhat less than what would be an optimum petroleum sulfonate for use in a conventional surfactant solution for recovering oil from a low salinity oil reservoir.

The salinity and divalent ion concentration of the aqueous phase of the emulsion used in our process will ordinarily be from about 50 to 95 percent of the salinity and divalent ion concentration of the water present in the formation. 2. The dispersed or discontinuous phase of the emulsion contains in part from 0.5 to 30 and preferably 2 to 10 percent by vol. of a hydrocarbon such as crude oil, naptha, kerosene, natural gasoline, or hydrocarbon in the range of from $C_6$ to $C_{30}$ and preferably from $C_{10}$ to $C_{20}$.

In preparing an emulsion for use in a subterranean formation according to the process of our invention, the first step is to identify the optimum alkylpolyalkoxyalkylene sulfonate or alkylarylpolyalkoxyalkylene sulfonate and the insoluble nonionic surfactant for the particular aqueous environment in which it must function, e.g. the formation water. The preferred method for formulating the emulsion for use according to our invention is first to mix the alkylpolyalkoxyalkylene sulfonate or alkylarylpolyalkoxy sulfonate in brine. The low HLB nonionic surfactant is then dissolved in the nonaqueous fluid, e.g. the oil or other hydrocarbon, and then the brine and oil are mixed together. Emulsions are formed more quickly and more easily using this method than if both surfactants are added to brine. Emulsions may be formulated by other sequences with final properties which are about as good as when the preferred method is employed, although more difficulty will be encountered in formulating the emulsion. The optimum materials are identified by preparing emulsions as described above containing both the alkylpolyalkoxyalkylene sulfonate or alkylarylpolyalkoxyalkylene sulfonte and the alkylpolyethoxy or alkylarylpolyethoxy nonionic surfactants having salinity and divalent ion concentration from 50 to 95% of the salinity and divalent ion concentration of the water in the formation in which they are to be used, and noting whether the emulsions are phase stable for at least 7 days at a temperature about equal to the temperature of the formation into which they are to be injected. If the emulsions are not phase stable, no further tests are needed since they will not be effective for oil recovery. If they are phase stable, they may or may not be effective for oil recovery, so oil recovery activity must be determined by measuring interfacial tension or making other appropriate measurements at the formation temperature. The interfacial tension between the formation crude oil and the emulsion should be less than $1 \times 10^{-2}$ and preferably less than $5 \times 10^{-3}$ dynes per centimeter. Based on the results obtained, additional tests may be needed on emulsions prepared using surfactants having one or two fewer and/or additional ethylene oxide units per molecule. As a guideline, in formation brines having salinities around 200,000 parts per million total dissolved solids including 10,000 parts per million divalent ions, the following surfactant combination has been found to be effective at a temperature of about 240° F:

A $C_{16}$ - $C_{20}$ linear alkyltriethoxypropylene sulfonate plus the six-mole ehtylene oxide adduct of a $C_{16}$ - $C_{20}$ linear alkanol.

Although emulsions may be formulated using alkylarylpolyalkoxyalkylene sulfonate, we have found that the alkkylpolyalkoxyalkylene sulfonates are preferred for use in high salinity, high temperature environments.

The number of ethoxy groups per molecule of each surfactant may be reduced by 1-3 for usein 150,000 parts per million salinity brine. These values should be considered as starting points, however, and the final preferred species should be identified by trial and error, varying the number of ethoxy groups by (+ or −) 1 or 2. Also, the effect of concentration should be determined by examining emulsions having concentrations of at least 0.5, 1.0 and 2.0 percent by weight of the alkoxy sulfonate, and the cncentration of nonionic surfactant, as well as the concentration of petroleum sulfonate or other additive should each be from about 2-50 percent and preferably from 5-20 percent of the concentration of the alkoxy sulfonate.

In the foregoing tests, phase stability is determined by mixing the emulsions, storing them in quiescent state for at least 7 days at the temperature of the formation in which they are to be used. The samples are observed visually during this period to determine the number of days they are phase stable. Phase instability is noted usually by the presence of two or more separate phases.

We have found that it is not essential that the alkyl or alkylaryl portion of the nonionic surfactant be the same as the alkyl or alkylaryl portion of the alkoxylated sulfonate. We have observed stabilization of surfactant-containing emulsions by the use of ethoxylated alkanols with alkylarylpolyalkoxyalkyl sulfonate as well as with the use of ethoxylated alkylphenols with alkylpolyalkoxyalkyl sulfonates as well as when alkyl compounds are used together or when alkylaryl compounds are used together. Ordinarily, the number of ethoxy groups per molecule should be roughly the same, although slightly less or more have also been found to be acceptable.

If the emulsion is phase stable at or near the formation temperature and phase unstable at surface ambient temerature, the emulsion should be heated to a temperature near the formation temperature or at least sufficiently to ensure phase stability prior to injecting it into the formation.

When the brine alone is used to displace the emulsion slug, it is preferred that the brine immediately following the slug containg the same or a slightly higher concentration of total dissolved solids as are contained in the aqueous phase of the preceeding emulsion. The purpose of this is to maintain the favorable viscosity and mobility control characteristics of the emulsion. Subsequently it may be advantageous to reduce the salinity to less than that of the emulsion, either stepwise or by a continuous tapering process.

Application of the above-described emulsion for oil recovery may otherwise utilize state-of-the-art surfactant waterflooding procedures. From 0.05 to 5.0 and preferably from 0.1 to 1.0 pore volume of emulsion will be injected into the formation. Sacrificial agents to prevent adsorption of surfactant may be injected before and/or with the emulsion. From 100 to 1500 parts per million hydrophilic polymer such as partially hydrolyzed polyacrylamide or polysaccharide may be included in the emulsion and/or in an aqueous slug injected after the emulsion for improved mobility control, if the temperature of the formation permits use of polymers and if no adverse interaction occurs between the polymer and surfactants present in the emulsion. Since the viscosity of the emulsion is ordinarily significantly greater than the viscosity of a solution of surfactants, polymer use may be reduced significantly or eliminate altogether.

EXPERIMENTAL SECTION

For the purpose of demonstrating the method of identifying the preferred embodiments of the process of our invention and the oil recovery efficiency achieved as a result of application of the process of our invention, the following experimental work was performed.

In the course of designing an emulsion flooding process for use in an oil-containing formation whose temperature is 240° F, and which formation contains water having a salinity of 205,000 parts per million total dissolved solids including about 10,000 parts per million divalent ions, principally calcium and magnesium, two representative emulsions were formulated and found to exhibit excellent characteristics. Both of these emulsions utilized a $C_{16}$-$C_{20}$ alkylpolyethoxypropylene sulfonate. In the course of manufacturing this or any compound corresponding to the first above formula in which the linking group R″ is propylene, at least two different species may be produced, (1) monoionic species: $-CH_2CH_2CH_2SO_3^-M^+$ and (2) a diionic species:

wherein X is an ionic oxygen-sulfur group, possible $-SO_2^-$. It is to the ratio of these species that the "diionicmonoionic" ratio given below refers. Also, in this or in any solubilizer such as is described by the formula above, commercial products may contain a minor amount of unsulfonated compound, which would be a nonionic surfactant. The emulsions were formulated as follows:

EXAMPLE I

An emulsion was prepared from the following components:

1. $C_{16}$-$C_{20}$ alkyltriethoxypropylene sulfonate (diionic-monoionic ratio=0.62) - 2%(w/v)
2. Field brine —82% (v.v), final salinity of 170,000 parts per million total dissolved solids.
3. Hexaethoxylated $C_{16}$-$C_{20}$ alcohol — 0.325% (w/v)
4. Crude oil — 7.7% (v/v)

In preparing the emulsion, separate solutions were made with 1+2 and 3+4, followed by blending of the two solutions with gentle heating.

The emulsion was very stable at room temperature and at 240° F. (115.6° C.). The viscosity of the emulsion was low at room temperature but appeared to become very high at 240° F. (115.6° C.). This is a surprising and very desirable property for this application since low viscosity at surface ambient temperature facilitates pumping the emulsion, while the high viscosity at formation temperatures improves volumetric sweep efficiency and reduces or eliminates the need for a separate polymer slug following the surfactant-containing fluid to achieve high volumetric displacement efficiency.

An oil recovery test using a Berea core containing field brine and saturated with crude oil to a level corresponding to oil saturation after a waterflood, was performed at 240° F. Emulsion (0.30 pore volume) was injected, followed by field brine to the conclusion of the flood. Net tertiary oil recovery was 60%, after correction for the amount of oil present in the emulsion injected into the core.

EXAMPLE II

An emulsion was prepared from the following components:

1. $C_{16}$-$C_{20}$ alkyltriethoxypropylene sulfonate (diionic-monoionic ratio=0.14)-2% (w/v)
2. Petroleum sulfonate (average equivalent weight =330)-0.4% (w/v)
3. Field brine—76% (v/v), final salinity about 156,000 ppm total dissolved solids.
4. Hexaethoxylated $C_{16}$-$C_{20}$ alcohol—0.2% (w/v)
5. Crude oil—7.6% (v/v)

In preparing the emulsion, separate solutions were made with 1+2+3 and with 4+5, followed by blending of the two solutions at about 170° F. to form a microemulsion or micellar dispersion. The resulting emulsion had stability and viscosity characteristics similar to those for the emulsion described in Example I.

An oil recovery test using a Berea core containing field brine and saturated with crude oil to a level corresponding to oil saturation after a waterflood, was performed at 240° F. The core then was pre-flushed with 0.20 pore volume of a 2% (w/v) solution of a chrome lignosulfonate sacrificial agent (Milchem's Unical ®), dissolved in synthetic seawater (34,000 ppm total dissolved solids) followed by a slug of 80% field brine (165,000 ppm total dissolved solids). Emulsion (0.15 and 0.10 pore volume slugs interspersed with a 0.30 pore volume slug of about 80% field brine) was injected followed by 87% field brine continuously tapered to 70% field brine by the conclusion of the flood.

new tertiary oil recovery was 75%, after correction for the amount of oil present in the emulsion injected into the core. A significant portion of the injected surfactant was produced in the effluent from the core, indicating low surfactant adsorption.

While our invention has been disclosed in terms of a number of illustrative embodiments, it is clearly not so limited since many variations thereof will be apparent to persons skilled in the art of enhanced oil recovery processes involving flooding with an emulsion without departing from the ture spirit and scope of our invention. Similarly, while a mechanism has been described to explain the results obtained from the use of the process of our invention, it is not necessarily hereby represented that this is the only or even the principal mechanism which is involved in application of the process of our invention, and it is not our desire or intention to be bound by any particular explanation or theory of the workings of the process of our invention. It is our intention and desire that our invention be limited and restricted only by those limitations and restrictions as appear in the claims appended hereinafter below.

We claim:

1. A method for recovering petroleum from a subterranean, permeable, petroleum-containing formation penetrated by at least one injection well and by at least one spaced-apart production well, both wells being in fluid communication with the formation, the temperature of the formation being from about 70° F. to about 300° F., said formation containing water having a salinity from 30,000 to 220,000 parts per million total dissolved solids, comprising:

(1) injecting into the formation via the injection well a phase-stable surfactant-containig emulsion comprising a continuous, saline, aqueous phase and a dispersed hydrocarbon phase, the surfactant comprising:

(a) from 0.05 to 10.0 percent by weight of a water soluble alkylpolyalkoxyalkylene sulfonate or alkylarylpolyalkoxyalkylene sulfonate having the following formula:

$$RO(R'O)_xR''SO_3^-M^+$$

wherein R is an alkyl or alkylaryl group, linear or branched having from 8 to 24 carbon atoms in the alkyl chain, R' is ethylene or a mixture of ethylene and propylene having relatively more ethylene than propylene, x is a number from 1 to 20, R'' is ethylene, propylene, hydroxypropylene or butylene, and $M^+$ is a monovalent cation; and (b) from 0.1 to 5.0 percent by weight of a low HLB, water insoluble nonionic surfactant having the following formula:

$$R'''O(CH_2CH_2O)_yH$$

wherein R''' has the same meaning as R and y is a number from 1 to 10;

(c) said aqueous phase having a salinity from about 45 to 95 percent of the formation water salinity;

(2) thereafter injecting brine into the formation to displace the emulsion through the formation, the salinity of the brine being initially as great as the salinity of the aqueous phase of the emulsion and is decreased to a salinity value less than the salinity of the aqueous phase of the emulsion during the time period during which the brine is injected, said emulsion and brine displacing petroleum through the formation to the production well; and (3) recovering petroleum displaced by the emulsion and brine from the formation via the production well.

2. A method as recited in claim 1 wherein R'' is ethylene.

3. A method as recited in claim 1 wherein R'' is propylene.

4. A method as recited in claim 1 wherein R'' is hydroxypropylene.

5. A method as recited in claim 1 wherein R'' is butylene.

6. A method as recited in claim 1 wherein $M^+$ is selected from the group consisting of sodium, potassium, lithium or ammonium.

7. A method as recited in claim 1 wherein the value of x is from 2 to 8.

8. A method as recited in claim 1 wherein R is an alkyl or alkylaryl group having from 12 to 24 carbon atoms in the alkyl chain.

9. A method as recited in claim 1 wherein y is from (x−2) to (x+4).

10. A method as recited in claim 1 wherein y is from x to (x+3).

11. A method as recited in claim 1 where the surfactant fluid also contains from 0.1 to 5.0 percent by weight of an organic sulfonate anionic surfactant selected from the group consisting of petroleum sulfonate, alkyl sulfonate, alkyarylsulfonate, and mixtures thereof.

12. A method as recited in claim 1 wherein the discontinuous hydrocarbon phase is from 0.5 to 30 percent by vol. of the emulsion.

13. A method as recited in claim 1 wherein the hydrocarbon is selected from the group consisting of crude oil, distilled fractions of crude oil including diesel oil, naphtha, kerosene, natural gasoline, hydrocarbons having from 6 to 30 carbon atoms, and mixtures thereof.

14. A method as recited in claim 1 wherein the emulsion is formed by dissolving the low HLB, water insoluble nonionic surfactant in the hydrocarbon, and dissolving the water soluble alkylpolyalkoxyalkylene sulfonate or alkyl arylpolyalkoxyalkylene sulfonate in the aqueous phase, and dispersing the hydrocarbon containing the low HLB nonionic surfactant in the aqueous phase comprising water with the water soluble surfactant dissolved therein.

* * * * *